United States Patent [19]

Hirose

[11] 4,059,245

[45] Nov. 22, 1977

[54] MAGNETIC RECORDING-REPRODUCING DEVICE

[75] Inventor: Huminori Hirose, Hirakata, Japan

[73] Assignee: Matsushita Electric Industrial Co., Ltd., Japan

[21] Appl. No.: 686,830

[22] Filed: May 17, 1976

[30] Foreign Application Priority Data

May 20, 1975 Japan .................................. 50-60795
May 20, 1975 Japan .................................. 50-60796
June 2, 1975 Japan .................................. 50-66820
June 2, 1975 Japan .................................. 50-66821

[51] Int. Cl.² .......................... G03B 1/04; G11B 15/32
[52] U.S. Cl. ..................................... 242/201; 192/45
[58] Field of Search ................. 242/200, 201-204, 242/67.3 R, 67.4, 54.1; 40/31, 38, 42, 46, 47, 86 R, 86 A-88; 192/41 R, 41 S, 41 A, 43-46; 360/89-96

[56] References Cited

U.S. PATENT DOCUMENTS

| 2,657,869 | 11/1953 | Owens | 242/54.1 |
| 3,459,390 | 8/1969 | Hugel | 242/200 |
| 3,465,357 | 9/1969 | Anderson | 242/191 |
| 3,806,061 | 10/1970 | Kollar et al. | 242/191 |

*Primary Examiner*—Leonard D. Christian
*Attorney, Agent, or Firm*—Burgess, Ryan and Wayne

[57] ABSTRACT

The invention discloses a magnetic recording-reproducing device wherein a reversible motor is drivingly coupled to two one-way rotary clutches one of which is engaged when rotated in one direction and the other of which is engaged when rotated in the other direction and to a capstan shaft for transporting a tape at a constant speed, and the one-way rotary clutches are drivingly coupled to two reel shafts, respectively, whereby depending upon the direction of rotation of the reversible motor, either of the reel shafts is selectively driven together with the capstan shaft.

3 Claims, 11 Drawing Figures

MAGNETIC RECORDING-REPRODUCING DEVICE

BACKGROUND OF THE INVENTION

The present invention relates generally to a magnetic recording-reproducing device such as a cassette tape recorder and more particularly a device for changing over the direction and speed of transport of the tape. The device is very simple in construction, compact in size and yet very reliable and stable in operation.

In the conventional magnetic recording-reproducing devices, the devices for changing over both the direction and speed of transport of the tape are in general complex in construction. For instance, in the tape recorder of the type in which the change-over lever is operated to control the idlers or the like to change the direction of rotation of the reel shafts and the flywheel, a large number of moving parts such as levers must be used. As a result, their assembly is difficult and tedious, and the operability is not satisfactory. Furthermore, their durability presents a problem. In addition, because a large number of moving parts are assembled, the vibration, oscillation and chatter problems also arise. Therefore, the conventional change-over devices are not satisfactory in performance.

SUMMARY OF THE INVENTION

In view of the above, one of the objects of the present invention is to provide a magnetic recording-reproducing device in which a device for controlling the transport of the tape is much simplified and which may eliminate such moving parts as levers, may be assembled in a simple manner and may ensure the simple yet positive change-over of the direction of transport of the tape by the simple operation of an electrical switch.

The above and other objects, features and advantages of the present invention will become apparent from the following description of preferred embodiments thereof taken in conjunction with the accompanying drawings.

DESCRIPTION OF THE PREFERRED EMBODIMENTS

First Embodiment, FIGS. 1 through 6

Figure 1:
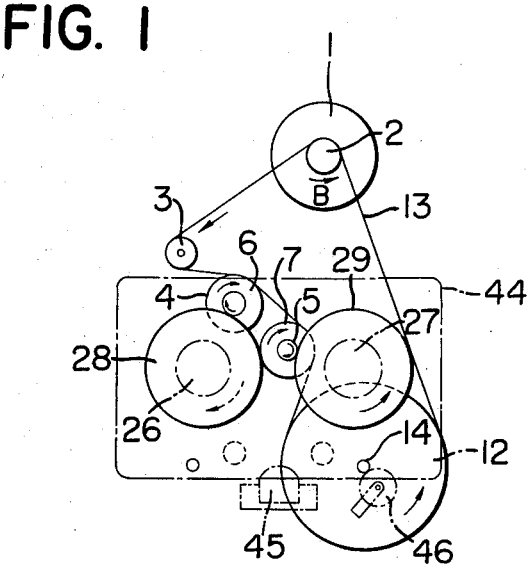
FIG. 1 is a schematic top view of a first embodiment of the present invention.
Figure 2:
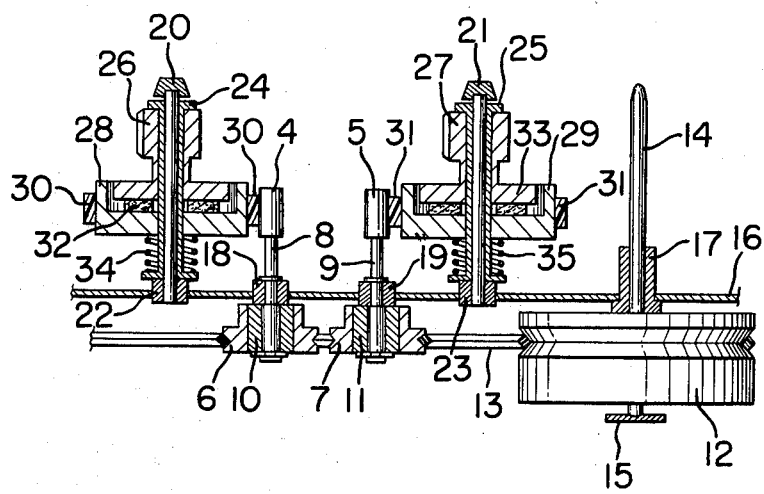
FIG. 2 is a fragmentary sectional view, in enlarged scale, thereof illustrating major components thereof.

Referring to FIGS. 1, 2, 3 and 4, reference numeral 1 denotes a motor; 2, a pulley attached to the motor 1; 3, a guide roller; 4 and 5, idlers; 6 and 7, pulleys drivingly coupled to idler shafts 8 and 9, respectively, through one-way clutches 10 and 11 to be described in detail hereinafter; 12, a flywheel; 13, an endless belt wrapped over the pulley 2 of the motor 1, the guide roller 3, the pulleys 6 and 7 and the flywheel 12; 14, a capstan shaft attached to the flywheel 12 coaxially thereof and rotatably supported by a bearing 17 which in turn is attached to a base plate 16, the lower end of the capstan shaft 14 being supported by a base plate 15; 18 and 19, bearings for rotatably supporting the idler shafts 8 and 9, respectively; 20 and 21, reel center shafts each having its hub 22 or 23 securely attached to the base plate 16; 23 and 25, pipes rotatably fitted over the reel center shafts 20 and 21, respectively; 26 and 27, reel shafts rotatably fitted over the pipes 23 and 25; 28 and 29, turntables securely fixed to the pipes 24 and 25; 30 and 31, annular rubber members fitted over the peripheries of the turntables 28 and 29; 32 and 33, pads interposed between the reel shafts 26 and 27 and the turntables 28 and 29; and 34 and 35, springs fitted over the pipes 24 and 25 between the hubs thereof and the turntables 28 and 29. The turntables 28 and 29 are normally biased upwardly under the forces of the springs 34 and 35 so that the reel shaft 26 or 27, the turntable 28 or 29 and the pad 32 or 33 may rotate in unison. But when the tape is completely taken up, the pad 32 or 33 slips even when the turntable 28 or 29 rotates so that the reel shaft 26 or 27 is not permitted to rotate. In FIG. 1, reference numeral 44 denotes a cassette; 45, a magnetic head; and 46, a pinch roller.

Figure 3:
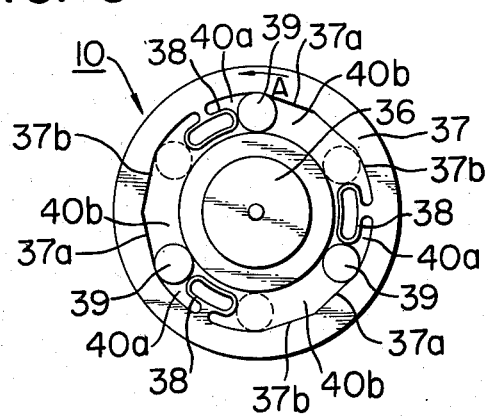
FIG. 3 is a schematic top view of a one-way rotary clutch thereof.
Figure 4:
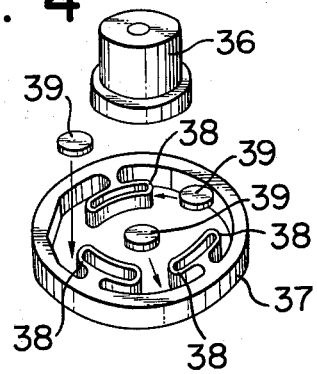
FIG. 4 is an exploded view thereof.

The one-way clutches 10 and 11 are similar in construction so that it will suffice to describe only the clutch 10. Referring particularly to FIG. 3 illustrating the one-way clutch 10, reference numeral 36 denotes an inner race carried by the reel shaft 8; 37, an outer race carried by the pulley 6; 38, spring members radially inwardly extended from the outer race 38; and 39, balls or cylindrical rollers interposed between the inner and outer races 36 and 37.

First and second inclined cam surfaces 37a and 37b are formed on the inner peripheral surface of the outer race 37 between the adjacent spring members 38 so that first and second cages or spaces 40a and 40b which are greater and smaller, respectively, than the outer diameter of the ball or cylindrical roller 39 may be defined between the inner and outer races 36 and 37. Therefore when the outer race 37 is rotated in the direction A indicated by the arrow, the ball or roller 39 is displaced in the opposite direction from the first or larger cage 40a to the second or smaller cage 40b where the ball or cylinder 39 is wedged between the inner and outer races 36 and 37. As a result, by the wedging action both the inner and outer races 36 and 37 are rotated in unison in the direction A. On the other hand when the outer race 37 rotates in the direction opposite to the direction A, the ball or roller 36 rotates freely in the first or larger cage 40a so that the rotation of the outer race 37 is not transmitted to the inner race 36. In order to transmit the rotation of the outer race 37 in the direction opposite to the direction A to the inner race 36, the ball or roller 39 must be placed in the position indicated a broken-line circle.

The first and second cam surfaces 37a and 37b and the spring members 38 may be molded in a simple manner from a suitable resin as parts integral with the outer race 37.

Figure 5:
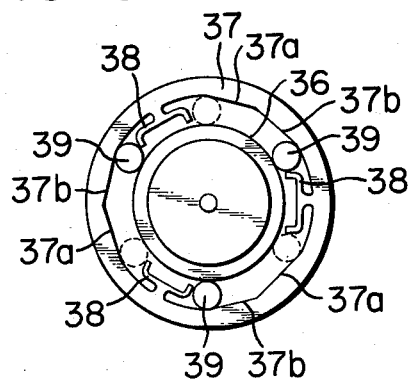
FIG. 5 is a schematic top view of a modification of a one-way rotary clutch shown in FIGS. 3 and 4.

The spring member 38 may be shaped as shown in FIG. 5. The shape of the spring members 38 must be so selected that they may be easily formed by molds and they may exhibit sufficient resilience. They are, of course, preferably made of sufficiently elastic resin. The first and second cam surfaces 37a and 37b may be formed on the outer peripheral surface of the inner race 36 so that the balls or rollers 39 may be wedged in the cage between the inner and outer races 36 and 37 when the latter rotates in one direction, but they are released from the second or smaller cam surfaces 37b when the outer race 37 rotates in the opposite direction, thus disengaging the inner race 36 from the outer race 37.

Figure 6:
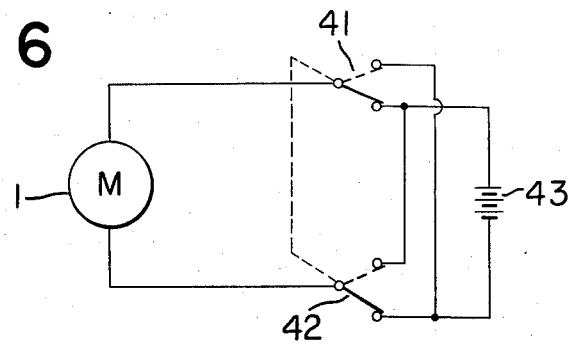
FIG. 6 is a diagram of a drive circuit of the first embodiment.

Next referring to FIG. 6, the connection of the motor 1 to a power supply 43 may be changed by changing over switches 41 and 42 which are interlocked so that the polarities applied to the terminals of the motor 1 may be changed to rotate the motor 1 in either direction. The switches 41 and 42 are also operatively coupled to the magnetic head 45 so that they may be changed over in response to the movement of the head 45.

Next the mode of operation of the first embodiment will be described. When the magnetic head 45 is displaced and made into contact with the tape, the switches 41 and 42 are so changed over that the motor 1 rotates in the direction indicated by the arrow B in FIG. 1 and consequently the pulleys 6 and 7 are rotated in the direction indicated by the arrows in FIG. 1. However, the one-way clutch 10 is disengaged so that the idler 4 will not rotate whereas the one-way clutch 11 is engaged so that the idler 5 rotates in the direction indicated by the arrow in FIG. 1. As a result, only the turntable 29 is rotated in the direction indicated by the arrow. The flywheel 12 is also rotated in the direction indicated by the arrow in FIG. 1 so that the tape is transported at a constant speed by the capstan shaft 14 and the pinch roller 46, passes the magnetic head 45 in contact therewith and is taken up by the reel shaft 27. Thus recording or reproducing is accomplished. In this case, both the reel shaft 26 and the idler 4 are rotated in the directions indicated by the broken line arrows in FIG. 1.

When the switches 41 and 42 are changed over to reverse the rotation of the motor 1, the one-way clutch 10 is engaged so that the idler 4 is rotated while the one-way cluch 11 is disengaged. As a result, only the turntable 28 and the reel shaft 26 are rotated, taking up or rewinding the tape.

In the first embodiment, the one-way clutches 10 and 11 have been described as being coupled to the idler shafts 8 and 9. However, two one-way clutches one of which is engaged when rotated in one direction and the other of which is engaged when rotated in the opposite direction may be directly attached to the driving shaft of the motor 1 and drivingly coupled to the respective reel shafts with endless belts or the like so that only one of the two reel shafts may be rotated.

According to the first embodiment, some of the mechanical parts such as a change-over lever and so on may be eliminated. Therefore, the magnetic recording-reproducing device may be made very simple in construction and assembly. Furthermore a long service life may be ensured, and the vibration and chatter problems may be eliminated so that the very satisfactory performance may be ensured. Since the change-over of the direction of transportation of the tape is made by the electrical switches, a greater force for operating a change-over lever is not required. That is, the reversal of the tape transportation may be considerably simplified and easily accomplished by the use of a touch control switch or the like. Therefore, unlike the conventional recording-reproducing device using a change-over lever, no annoying noise is produced in case of the reversal of the tape transportation. Since the reversal of the tape transportation is made by the electrical switch, the control panel or section may be made compact in size. Therefore when the magnetic recording-reproducing device in accordance with the present invention is combined with a radio receiver, various control knobs or the like may be arranged in a very compact space. As a result, the degree of freedom in design may be considerably increased.

Figure 7:
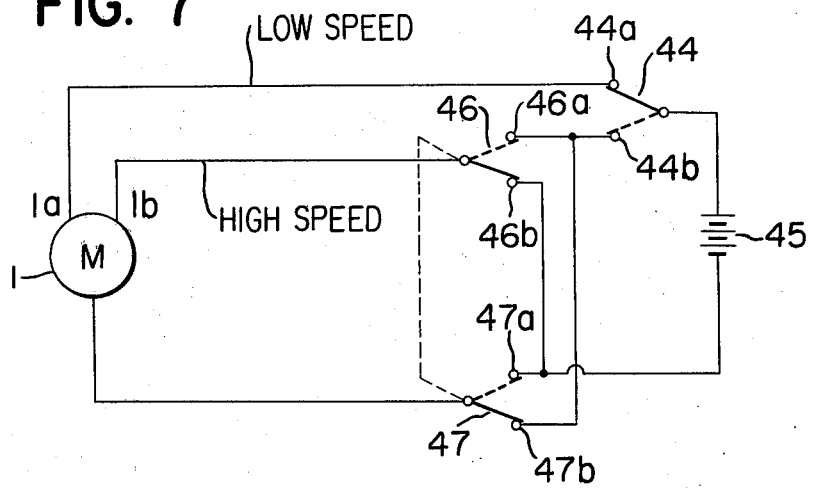
FIG. 7 is a diagram of a modification of a drive circuit used in the first embodiment.

Modification of First Embodiment, FIG. 7

The modification of the first embodiment is substantially similar in construction to the first embodiment except that a motor driving circuit is so designed that both the direction and rotational speed of the motor 1 may be changed as will be described in detail with reference to FIG. 7.

That is, the driving circuit includes a switch 44 for changing over between the low and high speeds and switches 46 and 47 for changing the polarities of a power supply 45 connected to the motor 1 for reversing. In case of the recording or reproducing mode, the stationary contact 44a of the change-over switch 44 is closed so that the motor 1 rotates at the low speed. On the other hand, in case of the fast forward mode, the stationary contact 44b of the switch 44 is closed and the contacts 46a and 47a of the reverse switches 46 and 47 are closed so that the motor 1 is rotated at the high speed in the forward direction. In case of the rewind mode, the contact 44b of the speed change-over switch 44 is closed while the stationary contacts 46b and 47b of the reverse switches 46 and 47 are also closed so that the motor 1 rotates at the high speed in the reverse direction. The above change-over operations of the switches 44, 46 and 47 are accomplished in response to the selection of operation for selecting the recording, reproducing, fast forward or rewind modes. Reference numerals 1a and 1b denote a highs speed terminal and a low speed terminal of the motor 1.

Next the mode of operation of the modification with the above construction will be described. When the magnetic head 45 is displaced and made into contact with the tape (not shown), the speed change-over switch 44 is so changed over that the motor 1 is rotated at the low speed in the forward direction indicated by the arrow B in FIG. 5. The pulleys 6 and 7 are rotated in the direction indicated by the arrows in FIG. 1. Since the one-way clutch 10 is disengaged the idler 4 is not rotated, but the one-way clutch 11 is engaged so that the idler 5 is rotated in the direction indicated by the arrow in FIG. 1. Consequently, the turntable 28 is rotated in the direction indicated by the arrow in FIG. 1. Since the flywheel 12 is also rotated in the direction indicated by the arrow in FIG. 1, the tape 4 is transported at a constant speed by the capstan shaft 14 and the pinch roller 46, passes over the magnetic head 45 and is taken by the reel shaft 27. Thus recording or reproduction is accomplished. In this case, the reel shaft 26 and the idler 4 are rotated in the directions indicated by the broken-line arrows in FIG. 1.

When the switches 44, 46 and 47 are changed over for the high-speed transport in the forward direction, the tape is transported at the high speed and taken up by the reel shaft 27 in a manner substantially similar to that described above. Thus fast forward is accomplished.

When the switches 44, 46 and 47 are changed over for the high-speed transportation in the reverse direction, the tape is transported at the high speed in the reverse direction and taken by the reel shaft 26. Thus rewind is accomplished.

It is preferable to have the pinch roller 46 moved away from the capstan shaft 14 in case of the fast forward or rewind mode.

According to the modification described above, the change-over operations for selecting the high or low speed and reversing the tape can be accomplished by the manipulation of the electrical switches. Therefore unlike the conventional magnetic recording-reproducing devices, no greater force is required for operating a change-over lever. Furthermore the magnetic recording-reproducing device may be made considerably simple in mechanism and compact in size.

Figure 8:
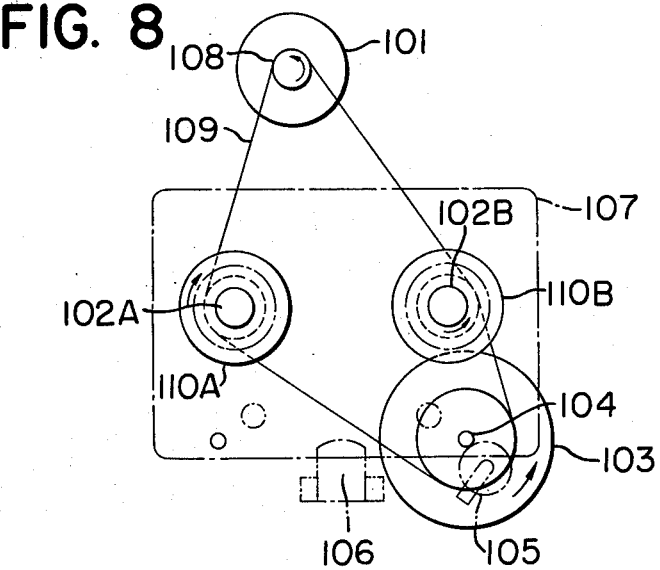
FIG. 8 is a schematic top view of a second embodiment of the present invention.
Figure 9:
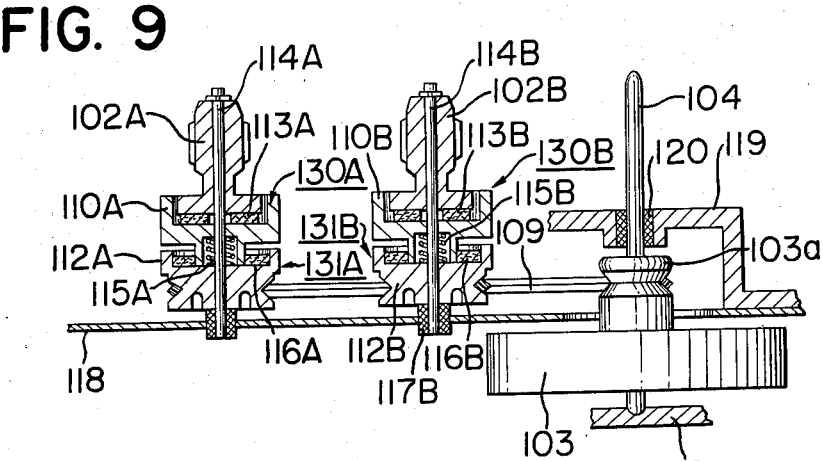
FIG. 9 is a fragmentary sectional view, in enlarged scale thereof, illustrating major components thereof.

Second Embodiment, FIGS. 8 and 9

Referring now to FIGS. 8 and 9 illustrating the second embodiment of the present invention, reference numeral 101 denotes a motor; 102A and 102B, reel shafts for driving engagement with the reels of a tape cartridge 107; 103, a flywheel; 104, a capstan shaft securely fixed to the flywheel 103 coaxially thereof; 105, a pinch roller; 106, a magnetic head; 108, a pulley carried by the driving shaft of the motor 101; and 109, a drive belt passing the pulley 108, pulleys 112A and 112B carried by the reel shafts 102A and 102B, respectively, and a pulley 103A carried by the capstan shaft 104. As shown in FIG. 9, the reel shafts 102A or 102B is rotatably carried by a reel center shaft 114A or 114B which in turn has its lower end received in a bearing well or metal bushing 117A or 117B attached to a chassis 118. Pads 113A and 113B are attached to the undersurfaces of the flanges of the reel shafts 102A and 102B. The reel shaft 102A, a turntable 110A and a spring 115A make up a slip clutch 103A while the reel shaft 102B, a turntable 110B and a spring 115B, a slip clutch 130B. The slip clutch 130A or 130B slips or is disengaged when the tape is taken up by either of the reels. The turntable 110A or 110B, the pulley 112A or 112B which is rotatably carried by the reel center shaft 114A or 114B and is normally rotated by the motor 101 through the drive belt 109, and cylindrical rollers 116A or 116B interposed between the pulley 112A or 112B and the reduced diameter section of the turntable 110A or 110B constitute a rotary clutch 131A or 131B. When the motor 101 is rotating, the pulleys 112A and 112B and the flywheel 103 are also rotating. The lower end of the capstan shaft 104 is supported by a receiving member 119 attached to the chassis 118, and the capstan shaft 104 is rotatably supported by a bearing 120 which in turn is also attached to the receiving member 119.

The construction and mode of operation of the one-way clutch 131A and 131B are substantially similar to those of the one-way clutches of the first embodiment described above with reference to FIGS. 3, 4 and 5. However, it should be noted that in the second embodiment the inner race is formed integral with the turntable so that the one-way clutch can be made more simple in construction.

When the motor 101 is rotated in the forward direction, the one-way rotary clutch 131A is disengaged so that the reel shaft 102A is not rotated while the one-way rotary clutch 131B is engaged so that the reel shaft 102B is rotated. Therefore in the recording, reproduction or fast forward mode, the tape is transported by the capstan shaft 104 and the pinch roller 105 and is taken up by the reel shaft 102B which is rotated. However, in case of the rewind mode, the reel shaft 102B is not rotated but the reel shaft 102A is driven to take up the tape.

The second embodiment described above has the distinct advantage in that since the turntable is used to provide the one-way clutch, the latter may be considerably simplified in construction and compact in size.

Figure 10:
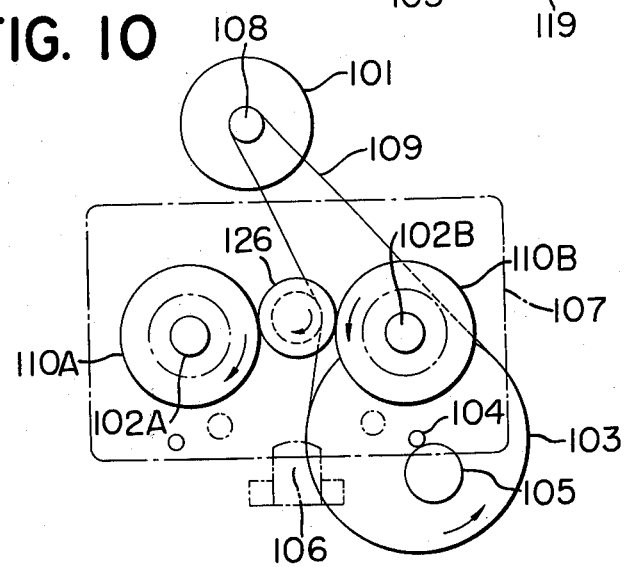
FIG. 10 is a schematic top view of a modification of the second embodiment.
Figure 11:
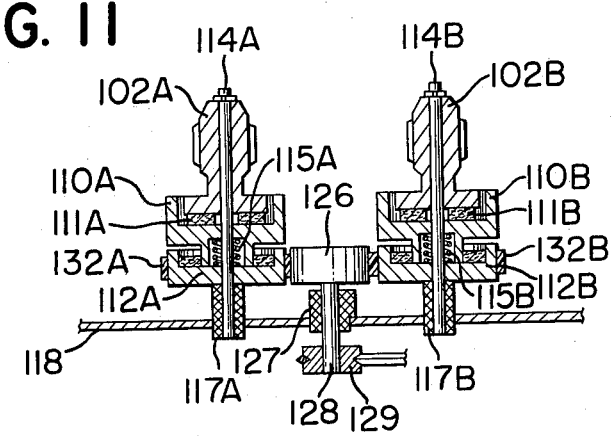
FIG. 11 is a fragmentary sectional view, in enlarged scale thereof, illustrating only major components thereof.

Modification of Second Embodiment, FIGS. 10 and 11

The modification of the second embodiment shown in FIGS. 10 and 11 is substantially similar in construction to the second embodiment except that instead of that the pulleys 112A and 112B are driven by the drive belt 109, they are driven by an idler wheel 126. That is, an annular rubber member 132A or 132B made of an elastic rubber is fitted over the pulley 112A or 112B and is made into driving contact with the periphery of the idler wheel 126 carried by a shaft 128 which in turn is rotatably supported by a bearing 127. A pulley 129 is attached to the lower end of the shaft 128, and is drivingly coupled with the drive belt 109 to the motor 101. Therefore the rotation of the motor 101 is transmitted to either of the reel shaft 112A or 112B.

What is claimed is:

1. A magnetic recording and reproducing apparatus comprising:
   a reversible motor;
   first and second rotatable reel shafts upon which corresponding reels containing a magnetic recording medium may be disposed;
   a capstan shaft for transporting said medium at a constant speed;
   first and second one-way rotary clutches each having an inner race and an outer race, one race of said first clutch being coupled for rotation with said first reel shaft, one race of said second clutch being coupled for rotation with said second reel shaft, said first clutch engaging when the other race thereof is rotated in a given direction and said second clutch engaging when the other race thereof is rotated in the opposite direction
   means for coupling said motor to said capstan and said other races for rotation therewith, said other races rotating in said given direction to drive said first reel shaft through said first clutch when said motor is driven in one direction, said other races rotating in said opposite direction to drive said second reel shaft through said second clutch when the driving direction of said motor is reversed;
   each of said clutches having the inner and outer race thereof disposed in coaxial relationship to define an annular space therebetween, a plurality of regularly angularly spaced apart spring members integrally formed with one of said inner and outer races thereof and radially extending into said annular space to define a corresponding plurality of cages in said annular space, the portions of the peripheral surfaces of said races forming walls of each cage converging toward each other adjacent a spring member at the end of the cage corresponding to a first rotational direction to form a roller engaging region, and diverging from each other adjacent another spring member at the other end of the cage corresponding to the opposite rotational direction to form a roller idling region, and a spherical or cylindrical roller disposed in each cage and having a diameter greater than the distance between said races in said roller engaging region and less than the distance between said races in said roller idling region, whereby said clutch is engaged when the races thereof are rotated to drive said rollers into said engaging regions, and said clutch is disengaged when the races thereof are rotated to drive said rollers into said idling regions.

2. Apparatus according to claim 1, further comprising a support plate, first and second reel center shafts mounted to said plate, said first and second reel shafts being concentric with and mounted on said first and second reel center shafts respectively, means for retaining said reel shafts on said reel center shafts, and spring means for urging each of said reel shafts against the corresponding retaining means to provide friction therebetween so that a minimum torque is required to rotate said reel shafts.

3. A one-way clutch having inner and outer races disposed in coaxial relationship to define an annular space therebetween, a plurality of regularly angularly spaced apart spring members integrally formed with one of said inner and outer races and radially extending into said annular space to define a corresponding plurality of cages in said annular space, the portions of the peripheral surfaces of said races forming walls of each cage converging toward each other adjacent a spring member at the end of the cage corresponding to a first rotational direction to form a roller engaging region, and diverging from each other adjacent another spring member at the other end of the cage corresponding to the opposite rotational direction to form a roller idling region, and a spherical or cylindrical roller disposed in each cage and having a diameter greater than the distance between said races in said roller engaging region and less than the distance between said races in said roller idling region, whereby said clutch is engaged when the races thereof are rotated to drive said rollers into said engaging regions, and said clutch is disengaged when the races thereof are rotated to drive said rollers into said idling regions.

* * * * *